(12) United States Patent
Rosenblattl

(10) Patent No.: US 10,503,582 B2
(45) Date of Patent: Dec. 10, 2019

(54) METHOD AND COMPUTER SYSTEM FOR FAULT TOLERANT DATA INTEGRITY VERIFICATION OF SAFETY-RELATED DATA

(71) Applicant: TTTech Computertechnik AG, Vienna (AT)

(72) Inventor: Maximilian Rosenblattl, Wr. Neustadt (AT)

(73) Assignee: TTTECH AUTO AG, Vienna (AT)

( * ) Notice: Subject to any disclaimer, the term of this patent is extended or adjusted under 35 U.S.C. 154(b) by 14 days.

(21) Appl. No.: 15/910,611

(22) Filed: Mar. 2, 2018

(65) Prior Publication Data
US 2018/0253352 A1 Sep. 6, 2018

(30) Foreign Application Priority Data
Mar. 6, 2017 (AT) .............................. A 50172/2017

(51) Int. Cl.
*G06F 11/07* (2006.01)
*G06F 11/10* (2006.01)

(52) U.S. Cl.
CPC ...... *G06F 11/0796* (2013.01); *G06F 11/1004* (2013.01); *G06F 2201/805* (2013.01); *G06F 2201/82* (2013.01)

(58) Field of Classification Search
CPC .................... G06F 11/0796; G06F 11/1004
See application file for complete search history.

(56) References Cited

U.S. PATENT DOCUMENTS 6,006,354 A * 12/1999 McGuinness ........... G06F 11/10
463/1
6,711,168 B1 * 3/2004 Yoshizawa .......... H04L 12/5601
370/395.1
(Continued)

OTHER PUBLICATIONS

Subasi, et al. (2016) CRC-based memory reliability for task-parallel HPC Applications, IEEE Int'l Parallel and Distributed Processing Symposium. May 23-27, 2016, Chicago / USA, 1101-1112.
(Continued)

*Primary Examiner* — Joseph D Torres
(74) *Attorney, Agent, or Firm* — Eversheds Sutherland (US) LLP

(57) ABSTRACT

A method for fault tolerant data integrity verification of safety-related data in a safety-related computer system is disclosed. The method includes a) randomly generating a set of at least two or more initial values, b) calculating, for each of the initial values, one specific CRC reference value, wherein each specific CRC reference value is calculated jointly from the safety-related data to be verified and the initial value associated with the specific CRC reference value, c) storing the pairs of initial value and associated specific CRC reference value, and d) following the steps a)-c), d1) randomly choosing an initial value out of the set of initial values generated in step a), d2) the non-safety-related hardware-engine calculating a CRC value jointly from the randomly chosen initial value and the safety-related data to be verified, d3) comparing the in step d2) calculated CRC value to the reference CRC value.

11 Claims, 3 Drawing Sheets

(56) References Cited

U.S. PATENT DOCUMENTS

| | | | | |
|---|---|---|---|---|
| 7,062,554 | B1* | 6/2006 | Gallagher | H04J 3/14 709/224 |
| 7,836,379 | B1* | 11/2010 | Ricci | G06F 11/1076 714/755 |
| 2002/0138850 | A1* | 9/2002 | Basil | H04L 12/2801 725/117 |
| 2009/0210590 | A1* | 8/2009 | Circello | G06F 13/24 710/64 |
| 2010/0192050 | A1* | 7/2010 | Burbridge | G11B 20/18 714/807 |
| 2011/0231636 | A1* | 9/2011 | Olson | H03M 13/158 712/222 |
| 2011/0239097 | A1* | 9/2011 | Bates | G06F 11/1004 714/807 |
| 2012/0027888 | A1 | 2/2012 | Isawa | |
| 2015/0082435 | A1 | 3/2015 | Roussellet | |
| 2015/0339184 | A1* | 11/2015 | Kasahara | G06F 13/00 714/758 |
| 2016/0014765 | A1 | 5/2016 | Desai et al. | |
| 2016/0306692 | A1* | 10/2016 | Yamamoto | H03M 13/6516 |
| 2018/0089019 | A1* | 3/2018 | Noyes | G06F 11/1004 |
| 2018/0089023 | A1* | 3/2018 | Wong | G06F 12/0875 |

OTHER PUBLICATIONS

Al-Obaidi, et al. (2013) Hardware acceleration of the robust header compression (RoHC) algorithm, 2013 IEEE Int'l Symposium on Circuits and Systems. May 19-23, 2013, Beijing / China, 293-296.

Bajarangbali, et al. (2016) Design of high speed CRC algorithm for Ethernet on FPGA using reduced lookup table algorithm. IEEE Annual India Conf. Dec. 16-18, 2016, Bangalore / India.

Office Action for Austrian Application No. A 50172/2017, dated Jul. 4, 2017 (4 Pages).

European Search Report, for EP Application No. 18160175.8, dated Jul. 5, 2018 (7 pages).

Avizienis, et al. Basic concepts and taxonomy of dependable and secure computing. IEEE Transactions on Dependable and Secure Computing, vol. 1, No. 1, pp. 11-33, Jan.-Mar. 2004.

Int'l Standard 6x1508:.Functional Safety, Safety Related Systems, FAQ, (2010) Int'l Electrotechnical Commission 61508, URL: http://www.iec.ch/functionalsafety/faq-ed2/page5.htm, 2010.

Kopetz (2011) Real-Time Systems: Design Principles for Distributed Embedded Applications (2nd ed.). Springer Publishing Company, Incorporated, 2011.

* cited by examiner

METHOD AND COMPUTER SYSTEM FOR FAULT TOLERANT DATA INTEGRITY VERIFICATION OF SAFETY-RELATED DATA

CROSS-REFERENCE TO RELATED APPLICATIONS

The invention claims priority to and the benefit of Austrian patent application No. A 50172/2017, filed Mar. 6, 2017, which is incorporated by reference herein in its entirety.

FIELD OF THE DISCLOSURE

The invention relates to a method for fault tolerant data integrity verification of safety-related data in a safety-related computer system, wherein the safety-related computer systems comprises an execution environment for executing safety-related software, a non-safety-related hardware-engine, which is adapted for computing of cyclic redundancy checks, and a memory area for storing said safety-related data.

BACKGROUND

The invention is related to the concepts of safety, or more concretely functional safety, and safety-related systems. Safety is defined "as the absence of catastrophic consequences on the user(s) and the environment" [1] or "the freedom from unacceptable risk of physical injury or of damage to the health of people, either directly, or indirectly as a result of damage to property or to the environment" [2]. Functional safety is defined as "the part of the overall safety that depends on a system or equipment operating correctly in response to its inputs" [2] or similarly as an "absence of unacceptable risk due to hazards caused by mal-functional behavior of electrical and/or electronic systems" [3].

A safety-related system is defined as a system "necessary to carry out one or more safety functions, where failure of the safety function would give rise to a significant increase in the risk to the safety of persons and/or the environment" [2]. Safety-related data is the data necessary for the execution of safety functions, such that if (some of) these data are compromised a particular safety function would fail.

Some commercial off-the-shelve microcontrollers provide execution environments for safety-related (e.g. ISO26262: 2011, IEC 615/08) software. Such environment is typically characterized by a hardware memory protection mechanism, which separates different software components from each other. It ensures that memory areas containing safety-related data are protected and can only be accessed by the safety-related software and such separates the safety-related software from the non-safety-related software.

Another mechanism to ensure a correct data processing of safety-related software is to use two redundant processor cores executing the same operations and comparing the results of their computations. If such computations are performed with a defined time delay, this mode is known as lockstep mode of operation and the cores are called lockstep cores. Safety execution environment typically also contains self-checking and advanced diagnostic features.

In many cases, such safety-related software needs to ensure integrity of static (never/infrequently modified) data, e.g. configuration data. Data integrity can be compromised by e.g., memory malfunction, cosmic radiation, or manufacturing defects.

One state-of-the art method of ensuring data integrity is to pre-calculate a CRC value of this data as a reference value once, and then re-do the calculation periodically to check if the CRC value is still equal to the reference value [4]. For safety-related data, these calculations are performed on safety-related an execution environment using safety-related software. When the data, e.g. configuration data, is large, this calculation can be very time consuming, which is especially true for embedded systems. For example, when the requirement is to check the data integrity every 20 ms, but the check itself consumes 15 ms, then the software spends 75% of its runtime for the integrity checks, making the device almost useless for real applications.

Many embedded microcontrollers have a built-in hardware engine, e.g. a hardware accelerator engine, for CRC calculations, which could free the CPU from the long-running CRC calculations. However, such CRC engines (also called "non-safety-related hardware-engine") are not capable to provide a CRC in the safety-level required by safety-related applications.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
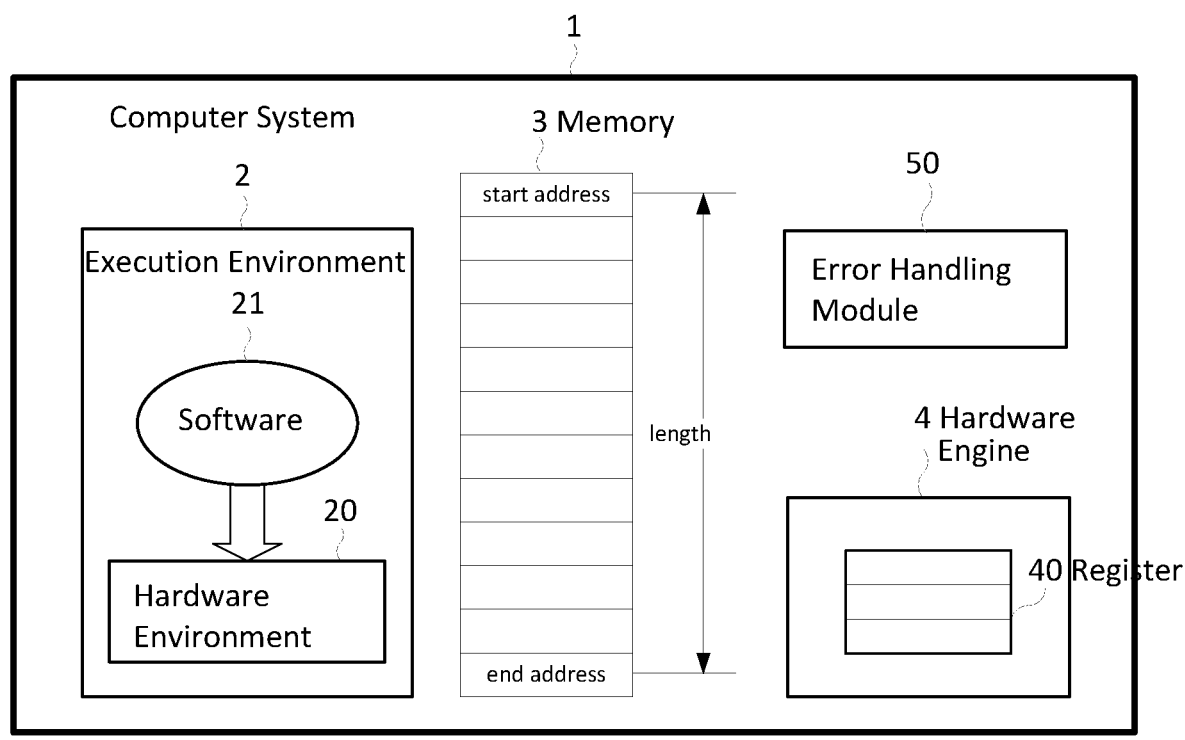
FIG. 1 depicts an example of a safety-related computer system according to the invention.

It is an object of the invention to provide an improved method for the fault tolerant data integrity verification of safety-related data in a safety-related computer system. This object is achieved with a method described in the introduction, which according to the invention comprises the steps of:
  a) randomly generating a set of at least two, preferably three, four or more initial values on the safety-related execution environment, preferably with a safety-related software,
  b) calculating on the safety-related execution environment with a safety-related software, for each of said initial values, one specific CRC ("cyclic redundancy check") reference value, wherein each specific CRC reference value is calculated jointly from the safety-related data to be verified and the initial value associated with said specific CRC reference value,
  c) storing the pairs of initial value and associated specific CRC reference value, and
  d) following the steps a)-c), executing the following steps:
    d1) randomly choosing an initial value out of the set of initial values generated in step a),
    d2) the non-safety-related hardware-engine calculating a CRC value jointly from said randomly chosen initial value and the safety-related data to be verified, and d3) comparing said in step d2) calculated CRC value to the reference CRC value, which is allocated to the initial value being used in step d2), and d3i) in case that the calculated CRC value is identical to the reference CRC value, starting with step d1) again, or d3ii) in case that the calculated CRC value is not identical to the reference CRC value, executing at least one specified or specifiable action.

Advantageous embodiments of this method are detailed hereinafter.

The at least one specified or specifiable action according to step d3ii) may be one of the following actions:

reporting an error, preferably to an error-handling module, especially an error-handling software module;

further executing steps d1)-d3) and reporting an error, preferably reporting to an error-handling module, especially an error-handling software module;

stopping the execution of steps d1)-d3);

stopping the execution of steps d1)-d3) and reporting an error, preferably reporting to an error-handling module, especially an error-handling software module;

executing a reset after a defined number of occurrences of events according to step d3ii);

executing a reset after a defined number of occurrences of events according to step d3ii) and reporting of an error, preferably reporting to an error-handling module, especially an error-handling software module.

In a preferred embodiment, in case that in step d3ii) the calculated CRC value is not identical to the reference CRC, executing the at least one specified or specifiable action persists in reporting of an error to an error-handling module, especially an error-handling software module. The error-handling module decides based on this report, if the execution of steps d1)-d3) is, preferably immediately, completely stopped, or the steps d1)-d3) are further executed, or a reset is executed after a defined number of occurrences according to step d3ii).

This means that steps d1)-d3) are executed periodically, until an error according to d3ii) occurs.

The pairs of initial value generated in step a) and corresponding specific CRC reference value may be stored in the safety-related memory area.

In step d1), the randomly chosen initial value may be chosen by a safety-related software being executed on the safety-related execution environment.

The randomly chosen initial value may be handed over before step d2) to the non-safety-related hardware-engine, preferably by said safety-related software. For example, the safety-related software which has chosen the initial value in step d1) writes the initial value into a dedicated register of the non-safety-related hardware-engine. The non-safety-related hardware-engine reads said initial value from said register for calculating in step d2) said CRC value jointly from said randomly chosen initial value and the safety-related data to be verified.

Step d3) may be executed on the safety-related execution environment by a safety-related software.

The CRC calculated in step d2) may be handed over before step d3) to the safety-related software being executed on the safety-related execution environment.

In step c), the pairs of initial value and corresponding specific CRC reference value may be stored in the safety-related memory area.

The object of the invention is also achieved with a method described in the introduction, which according to the invention comprises the steps of:

A) calculating an initial cycle redundancy check value, CRC value, for the safety-related data to be verified on the safety-related execution environment ("CRC reference value"), and B) following step A), executing the following steps:

B1) calculating a random initial value on the safety-related execution environment, B2) calculating one encoded CRC value from the random initial value and the data to be checked for integrity by the non-safety-related hardware-engine, B3) on the safety-related execution environment, decoding the encoded CRC value calculated in step B2) to eliminate said random initial value and to obtain a decoded CRC value, and B4) comparing the decoded CRC value retrieved in step B3) to the initial CRC reference value calculated in step A), and B4i) in case that the comparison in step B4) shows identical CRC values, starting with step B1) again, or B4ii) in case that the CRC values in step B4) are not identical to the, executing at least one specified or specifiable action.

Advantageous embodiments of this method are detailed hereinafter.

The at least one specified or specifiable action according to step B4ii) may be one of the following actions or a combination of at least two of the following actions:

reporting an error, preferably to an error-handling module, especially an error-handling software module;

further executing steps B1)-B4) and reporting an error, preferably reporting to an error-handling module, especially an error-handling software module;

stopping the execution of steps B1)-B4);

stopping the execution of steps B1)-B4) and reporting an error, preferably reporting to an error-handling module, especially an error-handling software module;

executing a reset after a defined number of occurrences of events according to step B4ii);

executing a reset after a defined number of occurrences of events according to step B4ii) and reporting of an error, preferably reporting to an error-handling module, especially an error-handling software module.

In a preferred embodiment, in case that in step B4ii) the calculated CRC value is not identical to the reference CRC, executing the at least one specified or specifiable action is reporting an error to an error-handling module, especially an error-handling software module. The error-handling module decides based on this report, if the execution of steps B1)-B4) is, preferably immediately, completely stopped, or the steps B1)-B4) are further executed, or a reset is executed after a defined number of occurrences according to step B4ii).

This means that steps B1)-B4) are executed periodically, until an error according to B4ii) occurs.

Step A), calculating an initial cycle redundancy check value, CRC, may be executed by the non-safety-related hardware-engine.

Step B1) may be realized with a safety-related software which is being executed on the safety-related execution environment and/or step B3) is realized with a safety-related software which is being executed on the safety-related execution environment.

Advantageous embodiments of the methods described above are detailed hereinafter.

The safety-related software may write the randomly chosen initial value according to step d1) or the random initial value according to step B1), and preferably a start address and the length of the memory area to be verified, to a configuration register of the non-safety related hardware-engine.

The non-safety related hardware-engine may store the calculated CRC according to step d2) or the calculated encoded CRC according to step B2), into a dedicated register of the non-safety related hardware-engine, and the safety-related software reads said encoded CRC from said dedicated register.

The non-safety related hardware engine can be realized in form of a hardware accelerator.

The safety-related data may be static data.

The safety-related software used in the different steps of the method can be realized in two or more different safety-related software program modules, for example each safety-related software is realized in an own safety-related software program module, or preferably the safety-related software is realized in one single safety-related software program module.

Additionally, the objects of the invention may also be achieved with a safety-related computer system comprising an execution environment for executing safety-related software, a non-safety-related hardware-engine, which is adapted for computing of cyclic redundancy checks, and a memory area for storing said safety-related data, characterized in that the computer system is adapted to execute a method as described above.

Advantageous embodiments of the computer system described above are detailed hereinafter.

The computer system may comprise an error-handling module, especially an error-handling software module, or wherein an error-handling module, especially an error-handling software module is assigned to the computer system.

The error-handling module may be realized in form of a safety-related error-handling module.

In the case that the safety-related software used in the different steps of the methods is realized in two or more different safety-related software program modules, for example each safety-related software is realized in an own safety-related software program module, or preferably the safety-related software is realized in one single safety-related software program module, the safety-related error-handling may be realized in one of said safety-related software program modules.

The safety-related error-handling module may be realized in an own safety-related software module, independently of how the safety-related software used in the different steps of the methods according to the invention is realized.

The realizations of the invention protect against the following faults in the non-safety related hardware engine with high diagnostic coverage, for example, providing an outdated result (not from the current execution, but some previous execution).

Thus, the methods and the computer system according to the invention ensure a freshly calculated CRC on every execution.

The invention combines a non-safety-related CRC hardware engine with a safety-related software to compensate against faults of the CRC hardware engine, so that the non-safety related hardware engine can be used to check the integrity of safety-related data.

FIG. 1 depicts an example of a safety-related computer system 1 comprising a safety-related execution environment 2, a memory 3 for storing data, and a hardware engine 4 for the computation of cyclic redundancy checks.

The hardware engine 4, a non-safety related hardware engine, also called CRC engine, typically is realized in form of a hardware accelerator. The hardware engine 4 comprises one or more registers, in the following called "register" 40.

The memory 3 is provided for storing safety-related data. It may also be provided that non-safety related data can be stored on said memory 3, preferably in a different region of the memory then the safety-related data, so that the safety-related data can be protected, or an additional memory can be provided for storing non-safety-related data.

The safety-related execution environment 2 comprises a safety-related hardware environment 20 which is capable of executing safety-related software 21.

Preferably, the computer system 1 comprises an error-handling module 50, especially an error-handling software module. For example, the error-handling module is a safety-related error-handling module, and in particular the safety-related error-handling is realized in form of a safety-related software, especially a safety-related software program module, which can be executed on the safety-related hardware environment 20.

Figure 2:
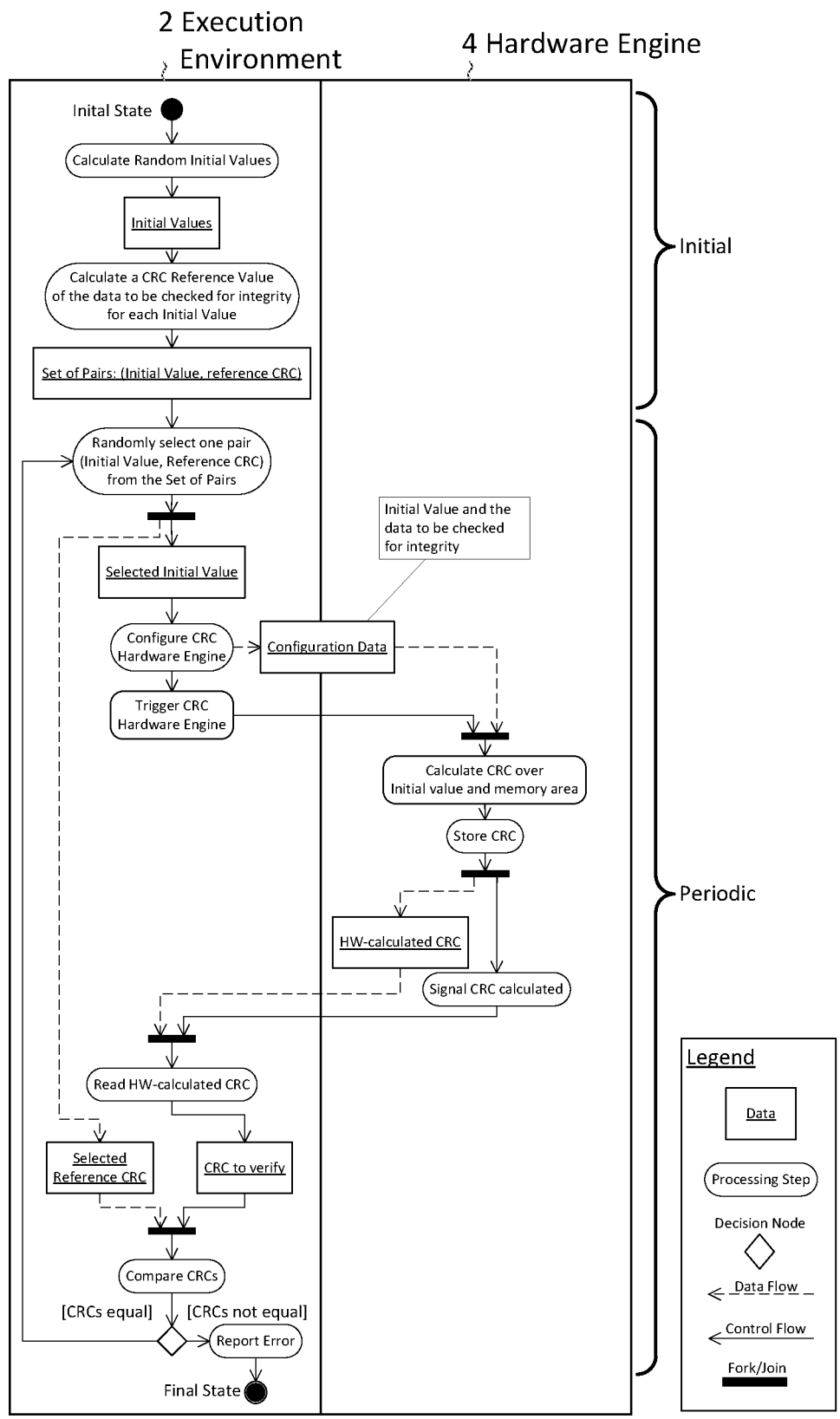
FIG. 2 depicts a first example of a method according to the invention.
Figure 3:
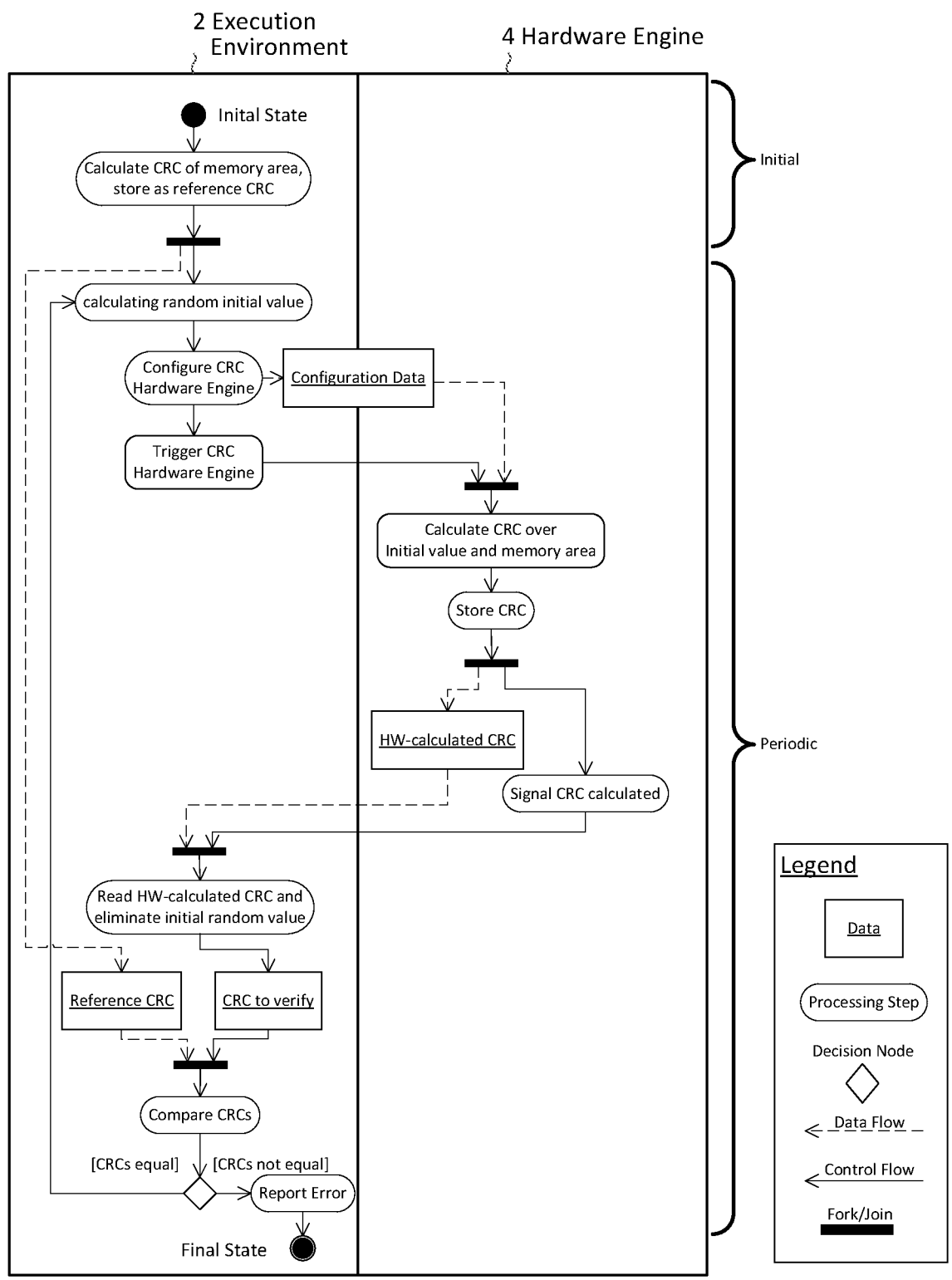
FIG. 3 depicts a second example of a method according to the invention.

FIG. 2 and FIG. 3 show methods according to the invention in a notation similar to Unified Modelling Language (UML) Activity Diagrams. CRC ("cyclic redundancy check") calculations of data, in particular of data to be verified, are performed using, for example, the formula: CRC=f(initial value, data)—this means that the CRC value is calculated jointly from an initial value and the data—or more concretely, the formula CRC=f(initial value, start address of memory area containing data, length of memory area containing said data), where the data for the CRC calculation is taken from the memory area identified by the start address of the memory area and its length. The use of initial values is advantageous for CRC calculations to prevent resulting zero CRCs if the data to be checked contain only zeroes.

FIG. 2 shows a first example of a method according to the invention being executed on a computer system 1 as shown in FIG. 1. At the beginning, the safety-related software calculates CRC reference values. For example, the calculations of CRC reference values can be done when the computer system 1 is powered on or restarted, and are performed only once during one runtime cycle of the computer system 1.

For that, the safety-related software, which is being executed on the safety-related execution environment 2, firstly randomly generates a set of two or more different random numbers to serve as initial values for CRC calculations. Secondly, said safety-related software calculates CRC reference values for the combination of each initial values and the (safety-related) data to be checked for the integrity. So, this calculation of CRC reference values is performed for each of the randomly generated initial values. Such, for each of the different initial values there is a corresponding CRC reference value, so that one CRC reference value is allocated to each of the initial values, the initial values and allocated CRC reference values forming a set of pairs of initial values and allocated CRC reference values. This set is saved in the memory 3, in particular in an area of this memory 3 which is protected for safety-related data.

After the initial calculation of CRC reference values, the following steps are executed periodically:

The safety-related software 21 randomly choses one initial value from the set of initial values calculated during initialization.

Configuration of the hardware engine 4: In the described realization of the method according to the invention, this configuration is performed such that the safety-related software writes the chosen initial value, the start address of the memory area to be checked, and the length of said memory area (for identifying where the safety-related data to be checked are stored in the memory 3) into the configuration register 40 of the hardware engine 4).

After that, the safety-related software triggers the hardware engine 4 for calculating a CRC value. The hardware engine 4 now calculates a CRC value using the randomly chosen initial value and the safety-related data from the memory area, stores such calculated CRC into its register 40, and signals to the safety-related software 21 that the CRC calculation is finished.

The safety-related software 21 reads this hardware-calculated CRC and compares it to the CRC reference value that corresponds to the chosen initial value from the set of initial values and CRC reference values:

If an error occurs, i.e. that the value of the hardware-calculated CRC value and the CRC reference value are not identical, a specified action is executed, preferably by the safety-related software. Usually this action persists in reporting an error. For example, the error is reported to an error-handling module, especially to an error-handling software module. The error-handling module decides based on this report, for example, if the execution of the steps described before is, preferably immediately, completely stopped, if the steps are further executed, or if a reset is executed after a defined number of occurrences such errors.

If the value of the hardware-calculated CRC value and the CRC reference value are identical, the above described steps are executed again. Accordingly, the above steps are executed periodically until an error occurs or until another event occurs, for example, reaching a time limit for the execution of the method.

FIG. 3 shows a further method according to the invention represented in a notation similar to Unified Modelling Language (UML) Activity Diagrams. Here, the safety-related software initially calculates a CRC reference value for the safety-related data to be checked/verified for integrity. For example, this can be done when a system is powered on or restarted and is performed only once for one system runtime cycle.

After this initialization, following steps are periodically executed:

The safety-related software 21 calculates a random initial value, which can be used for a CRC calculation as described in the following. This random initial value can be stored in the memory 3, in particular in an area which is protected for safety-related data.

The next step is to configure the non safety-related hardware engine 4. In this realization, this configuration is performed such that the safety-related software 21 writes the calculated random initial value, the start address of the memory area to be checked, and the length of the memory area to be checked (for identifying where the safety-related data to be checked are stored in the memory 3) into the configuration registers 40 of the hardware engine 4.

After that, the safety-related software 21 triggers the CRC calculation on the hardware engine 4. The hardware engine 4 thus calculates a so-called encoded CRC value using the initial value and the (safety-related) data from the memory area as identified by start address and length of the memory 3, stores such calculated CRC into its register 40, and signals to the safety-related software 21 that the CRC calculation is finished.

The safety-related software then reads the encoded calculated CRC, which is being based on the random initial value and the data to be verified, executes a reverse transformation of this calculated CRC value to eliminate the initial value and to obtain a "decoded" CRC value, which corresponds to the initially calculated CRC reference value ("corresponding" in this context means that both CRC values should be based only on the same data to be verified).

Now, the safety-related software 21 compares said decoded CRC value with the initial CRC reference value:

If an error occurs, i.e. that the value of the hardware-calculated CRC value and the CRC reference value are not identical, a specified action is executed, preferably by the safety-related software. Usually this action persists in reporting an error. For example, the error is reported to an error-handling module, especially to an error-handling software module. The error-handling module decides based on this report, for example, if the execution of the steps described before is, preferably immediately, completely stopped, if the steps are further executed, or if a reset is executed after a defined number of occurrences such errors.

If the value of the hardware-calculated CRC value and the CRC reference value are identical, the above described steps are executed again. Accordingly, the above steps are executed periodically until an error occurs or until another event occurs, for example, reaching a time limit for the execution of the method.

CITATIONS

[1] A. Avizienis, J. C. Laprie, B. Randell and C. Landwehr, "Basic concepts and taxonomy of dependable and secure computing," in *IEEE Transactions on Dependable and Secure Computing*, vol. 1, no. 1, pp. 11-33, January-March 2004.

[2] International Standard 6x1508: Functional Safety, Safety Related Systems, FAQ, *International Electrotechnical Commission IEC/EN* 61508, http://www.iec.ch/functionalsafety/faq-ed2/page5.htm, 2010.

[3] International Organization for Standardization ISO), IS026262 Road Vehicles Functional Safety, ISO", November 2011.

[4] Hermann Kopetz. 2011. *Real-Time Systems: Design Principles for Distributed Embedded Applications* (2nd ed.). Springer Publishing Company, Incorporated.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for fault tolerant data integrity verification of safety-related data in a safety-related computer system, wherein the safety-related computer systems comprises an execution environment for executing safety-related software, a non-safety-related hardware-engine adapted for computing of cyclic redundancy checks, and a memory area for storing said safety-related data, the method comprising the steps of:
   a) randomly generating a set of two or more initial values on the safety-related execution environment with the safety-related software,
   b) calculating on the safety-related execution environment with the safety-related software, for the set of two or more initial values, a specific cyclic redundancy check ("CRC") reference value, wherein the specific CRC reference value is calculated jointly from the safety-related data to be verified and the set of two or more initial values associated with the specific CRC reference value,
   c) storing the set of two or more initial values and the specific CRC reference value, and
   d) following the steps a)-c), executing the following steps:
      d1) randomly choosing an initial value out of the set of two or more initial values generated in step a),
      d2) calculating, by the non-safety-related hardware-engine, a CRC value jointly from said randomly chosen initial value and the safety-related data to be verified, and
      d3) comparing the CRC value in step d2) to the specific CRC reference value, which is associated with the initial value being used in step d2), and
         d3i) in case that the CRC value in step d2) is identical to the specific CRC reference value, starting with step d1) again, or
         d3ii) in case that the CRC value in step d2) is not identical to the specific CRC reference value, executing at least one specified or specifiable action.

2. The method according to claim 1, wherein the at least one specified or specifiable action according to step d3ii) is one of the following actions:
   reporting an error to an error-handling software module;
   further executing steps d1)-d3) and reporting an error to an error-handling software module;
   stopping the execution of steps d1)-d3);
   stopping the execution of steps d1)-d3) and reporting an error to an error-handling software module;
   executing a reset after a defined number of occurrences of events according to step d3ii); and/or
   executing a reset after a defined number of occurrences of events according to step d3ii) and reporting of an error to an error-handling software module.

3. The method according to claim 1, wherein the set of two or more initial values generated in step a) and corresponding specific CRC reference value are stored in the memory area.

4. The method according to claim 1, wherein in step d1) the randomly chosen initial value is chosen by the safety-related software being executed on the safety-related execution environment.

5. The method according to claim 4, wherein the randomly chosen initial value is provided before step d2) to the non-safety-related hardware-engine by said safety-related software.

6. The method according to claim 1, wherein step d3) is executed on the safety-related execution environment by the safety-related software.

7. The method according to claim 6, wherein before step d3) the CRC value in step d2) is provided to the safety-related software being executed on the safety-related execution environment.

8. The method according to claim 1, wherein in step c) the set of two or more initial values and corresponding specific CRC reference value are stored in the safety-related memory area.

9. The method according to claim 1, wherein the non-safety related hardware engine comprises a hardware accelerator.

10. The method according to claim 1, wherein the safety-related data is static data.

11. The method according to claim 1, wherein the safety-related software comprises two or more different safety-related software program modules comprising multiple safety-related software program modules or a single safety-related software program module.

* * * * *